SOUND REPRODUCING SYSTEMS

Filed April 1, 1959 3 Sheets-Sheet 1

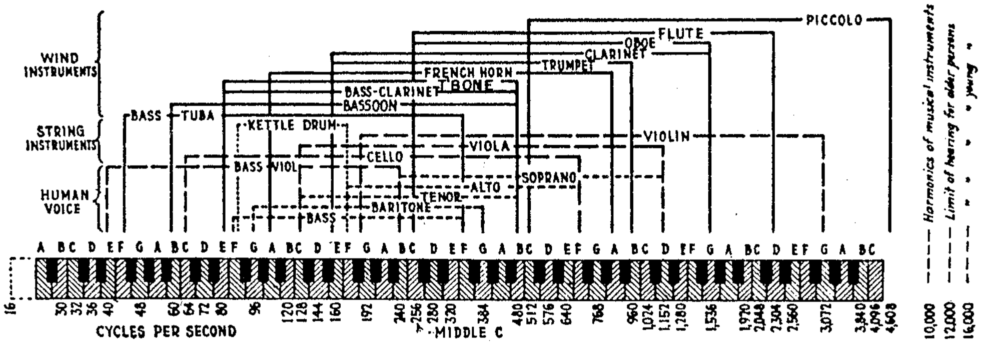

FIG. 1

| MUSICAL INSTRUMENTS | LOW (BASS) | | INTERMEDIATE | | HIGH (TREBLE) | |
|---|---|---|---|---|---|---|
| STRING | DOUBLE BASS (BASS VIOL) | 40-240 | VIOLA | 128-1152 | VIOLIN | 192-3072 |
| | VIOLINCELLO | 64-640 | | | | |
| WOODWIND | BASS CLARINET | 60-480 | CLARINET | 160-1536 | FLUTE | 256-2304 |
| | BASSOON | 60-480 | | | OBOE | 256-1536 |
| | | | | | PICCOLO | 512-4608 |
| BRASS | TROMBONE | 80-480 | TRUMPET | 160-960 | | |
| | BASS TUBA | 40-320 | FRENCH HORN | 96-768 | | |
| PERCUSSION | KETTLE DRUM | 60-160 | | | | |
| | PIANO 30-4096 | | | | | |
| | MIDDLE C-256 | | | | | |
| HUMAN VOICE (SINGING) | BASS | 80-320 | BARITONE | 96-384 | SOPRANO | 340-1152 |
| | | | TENOR | 128-480 | | |
| | | | ALTO | 160-460 | | |

FIG. 2

INVENTOR
HAROLD C. HOGENCAMP

BY Leach & Radue

INVENTOR
HAROLD C. HOGENCAMP
BY Leach & Rahe
ATTORNEY

June 12, 1962 H. C. HOGENCAMP 3,038,966

SOUND REPRODUCING SYSTEMS

Filed April 1, 1959 3 Sheets-Sheet 3

INVENTOR

HAROLD C. HOGENCAMP

BY Leech & Radue ATTORNEYS 3,038,966
Patented June 12, 1962

3,038,966

SOUND REPRODUCING SYSTEMS

Harold C. Hogencamp, Columbus, Ga., assignor to Stereotone, Inc., a corporation of Georgia Filed Apr. 1, 1959, Ser. No. 803,485
7 Claims. (Cl. 179—1)

This invention relates to improvements in methods and means for electrical and/or electronic reproduction of sound, particularly musical sound.

While the various apparati and methods heretofore known and proposed for sound reproduction have progressively improved, successively from the original mechanical diaphragm used in the earliest phonographs with cylindrical records to the modern electrical/electronic hi-fi (high fidelity) and stereo (stereophonic) types of reproduction, each step has necessitated the use of additional and more costly equipment. Also, and most important, each step has resulted in causing almost complete obsolescence of previously known and used equipment and, in the case of phonograph recordings (first cylindrical, then disc) has resulted not only in the complete obsolescence of the reproducing equipment but has also necessitated the purchase of the newer, more advanced recordings and the complete discarding of records made and used under older processes. This, in addition to the monetary loss and added cost involved, has meant that collections of records holding invaluable sentimental memories have necessarily become obsolete and useless.

The presently disclosed invention does not add to the equipment and apparatus needed, as compared to that used for present-day stereophonic reproduction—rather, if used exclusively for "stereotone" reproduction it can be simplified and even when used to also provide true stereophonic reproduction it requires no substantial added equipment. Further, it does not cause obsolescence of older recordings and record collections but rather adds to their value since it prolongs and increases their usefulness because it so improves and enhances the sound reproduction obtainable from them.

My invention is based upon my discovery of certain previously overlooked natural and scientific facts relative to the sound spectrum.

After careful analysis I have devised methods and means of reproducing sound in an enhanced and more natural manner in accordance with this discovery.

In order to differentiate from the commonly known type of stereophonic sound, wherein sound is reproduced from separate sources such as two sound tracks, I term the enhanced sound resulting from the teachings of this invention "stereotonal" sound and call the equipment and apparatus employed to produce this effect the stereotone system of sound reproduction.

By definition: Stereotonal sound is the resulting sound obtained through the method of sound reproduction which produces stereo effects by reason of tonal separation of audio frequencies coming from a common monaural originating source and utilizing a spacial positioning of the electromechanical reproducers or loud speakers.

With the foregoing in mind, one primary object of this invention is the provision of new and improved methods and means for enhancing sound, particularly music, reproduced electromechanically.

A second object is to provide methods and means for reproducing sound more realistically and for using tonal-diversity to produce stereo effects.

Other objects and advantages will become apparent from the following disclosure.

My invention resides in the new and improved methods and means as hereinafter described and claimed and is based upon new discoveries and analysis of natural phenomena in the original creation of sounds, particularly musical sounds.

Since the basic ideas of my invention could be practically embodied by means of different constructions and circuit arrangements, I do not deem it necessary to show or describe in all detail any specific form of apparatus. The invention will be apparent and readily understandable by study of the following description, together with the accompanying drawings and charts, in which:

FIG. 1 is a standard chart of the audio spectrum, including normal audio frequency ranges of human voices and musical instruments;

FIG. 2 is an analytical chart derived from the data included in FIG. 1;

Figure 7:
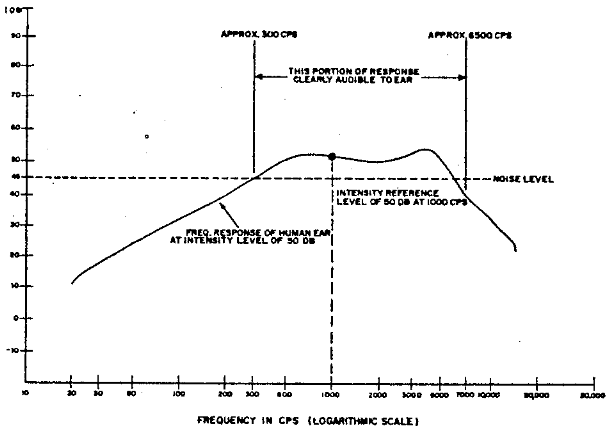
FIG. 7 shows the response curve of human audibility.
Figure 8:
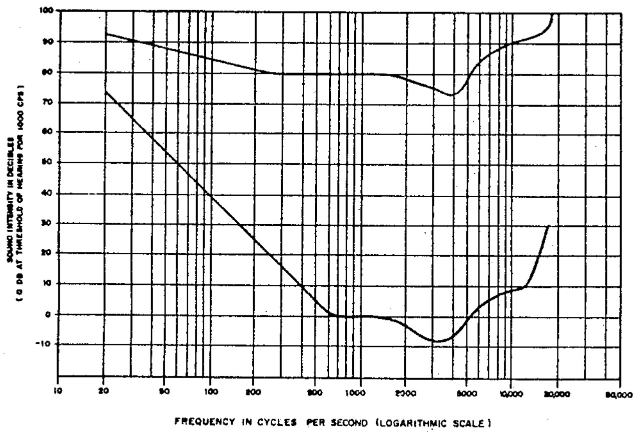
FIG. 8 is a chart showing sound intensity requirements.
Figure 9A:
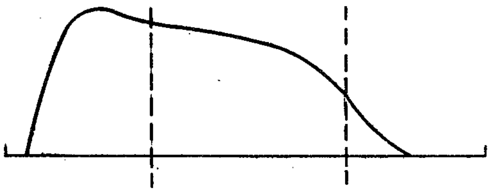

FIGS. 9(A) and (B) depict typical frequency response curves of the two co-operating sound channels as utilized in the present invention, illustrated in the conventional manner with frequency in cycles/second shown horizontally on a logarithmic scale similar to FIGURES 7 and 8 and with the vertical scale in decibels, the dotted lines indicating the substantial extent of augmenting areas of response having curves of like characteristics.

Figure 6:
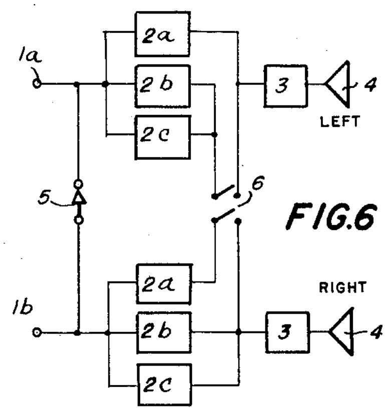
FIG. 6 shows another arrangement of apparatus in block-diagram form.

In the drawings: FIGS. 1, 2, 3, 4, 7, 8 and 9(A) and (B) are self-explanatory and are fully marked and worded. They will be further described. In FIGS. 5 and 6 like reference numerals are used to designate like portions, sections or parts of the block-diagrams embodied.

In FIGS. 5 and 6, the numeral 1 represents a monaural audio-signal source, while 1(*a*) and 1(*b*) represent the two cooperating audio-signal sources needed for standard two-channel stereophonic sound reproduction.

The numerals 2(*a*), (*b*), and (*c*) each designate limited tone-frequency audio amplifiers as further to be described. The reference numeral 3 represents, in all cases, identical voltage and power output amplifiers, while the numeral 4 designates loud speakers or loud speaker arrays, also preferably identical.

It will be noted that the tonal-amplifier 2(*c*) appears only in FIG. 6, although a like tone-amplifier might also be shown and used in the arrangement of FIG. 5. The reference numerals 5 and 6, both representing electric switches are shown only in FIG. 6 and their construction and uses will be further described.

Referring in more detail to the drawings and charts.

FIG. 1 is a reproduction of a standard chart of the audio spectrum as printed in Electronics magazine and reprinted in Practical Radio Communication, a textbook written by Nilson and Horning and printed by the McGraw-Hill Book Company, New York and London. The chart of FIG. 1 is shown only so that it can be analyzed.

The chart or table of FIG. 2 shows such an analysis, as derived from FIG. 1.

In FIG. 2 the frequency ranges of human (singing) voices and various musical instruments are shown and enumerated. From FIG. 2 it will become apparent that the over-all range of audible sound frequencies can readily be broken down into three portions, or sub-bands, with only slight overlap; each sub-band covering basically and primarily only the frequency ranges of certain musical voices and instruments.

Basically and fundamentally the facts of this analysis constitute the discovery which makes possible the present invention.

Figure 3:
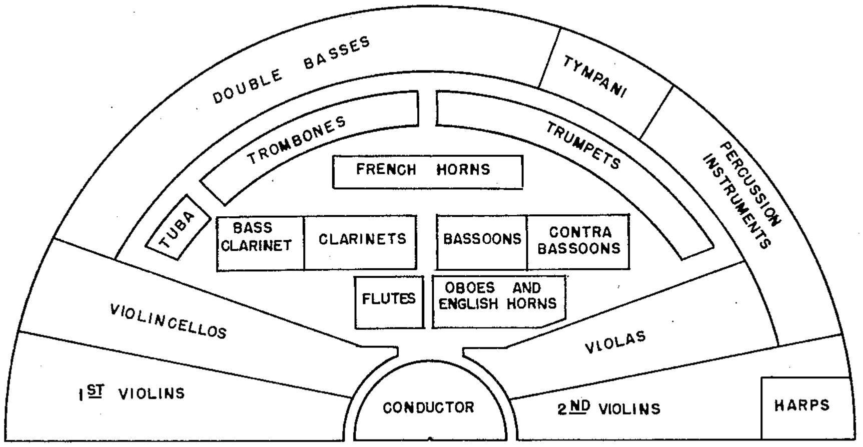
FIG. 3 shows a seating plan for an orchestra.

FIG. 3 shows a seating plan for an orchestra, as shown in Album 2 of the Philharmonic Family Library of Great Music. This figure is self-explanatory and is shown only to make possible its analysis.

Figure 4:
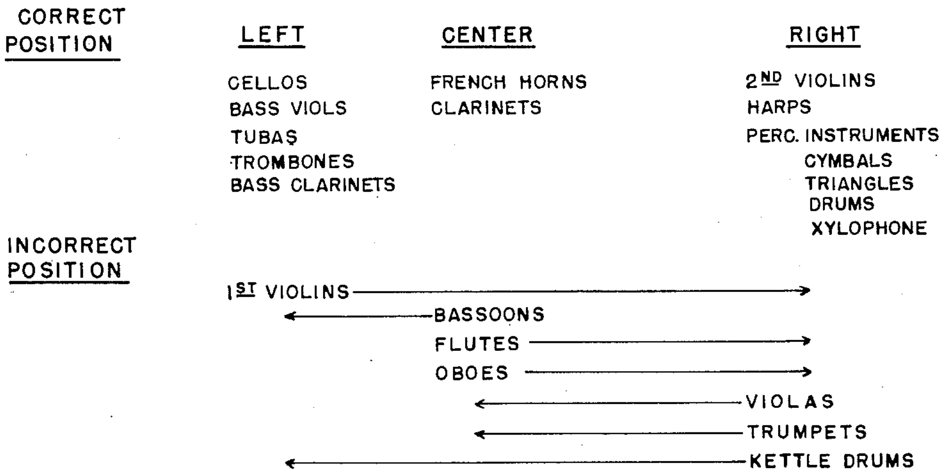
FIG. 4 is a second analytical chart based upon the seating plan of FIG. 3.
Figure 5:
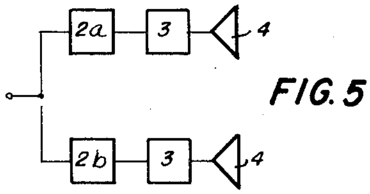
FIG. 5 is a block diagram of one apparatus arrangement in accordance with the present invention.

FIG. 4 shows in graphic form an analysis of the seating plan of FIG. 3, listing the several musical instruments in their normal physical position—left, center and right.

Notation is also given as to whether such an arrangement constitutes correct or incorrect frequency ranges (i.e. low, intermediate and/or high) as would be reproduced from left speaker, both speakers or right speaker in accordance with the present invention.

Surprisingly, until analyzed, a large majority of the instruments are "correctly" positioned in this respect. It is also to be noted that most of the remaining "incorrectly" positioned instruments would appear to be moved only from center (both speakers) to right or vice versa, as indicated by the arrows in FIG. 4, when reproduced with stereotonal sound. Such relatively slight re-positioning is not at all objectionable to most listeners and, in fact, is hardly noticeable even to the trained musical ear.

In a complete and studied analysis of the sound spectrum as relates to frequency ranges of musical instruments and human singing voices and as shown in FIG. 4 of the drawings, consideration must also be given to the fact that largely only the center register is used—extreme lows and extreme highs of the range of an individual instrument or voice are seldom used.

This aids then in a proper and correct evaluation and division of the entire audible range into low, overlapping intermediate, and high frequencies as interpreted and embodied in the present invention.

Putting the discovery and invention into practice a better understanding can be obtained by study of FIG. 5 of the drawings, together with the following explanation.

Electrical signals representative of musical sounds picked up by a microphone or transducer device, directly, in amplified form, or recorded on film, tape or disc, or transmitted over radio waves constitute the audio source 1.

The (electrical) audio frequencies emanating from source 1 are simultaneously fed into or supplied to the inputs of tonal-amplifiers 2(*a*) and 2(*b*). Each of these tonal-amplifiers, 2(*a*) and 2(*b*) include frequency-band discriminating filters as well as attenuators or volume controls. Preferably such frequency-band discriminating filters (also known as band-pass filters) are included both in the input and the output circuits of each amplifier, 2(*a*) and 2(*b*). While called amplifiers the apparatus contained therein may act to attenuate as well as amplify the incoming electrical impulses, as determined by the positioning of the volume or sound-level controls and the circuitry involved.

Figure 9B:
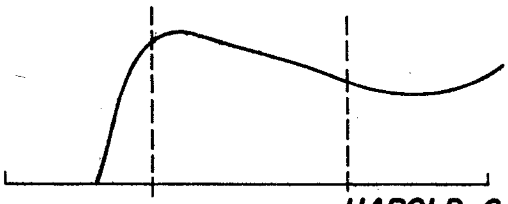

However, each acts to pass one portion of the composite and varying audio frequency band coming from source 1; one amplifier 2 passing the lowest portion of the frequency band plus intermediate audio frequencies, such as designated previously in this disclosure. The second amplifier 2 passes all desired high frequencies plus a certain range of intermediate frequencies, such intermediate portion of the band overlapping the like intermediate frequency range of the first amplifier 2 and having like characteristics as shown. Such overlapping or augmenting is illustrated by the portions between vertical dotted lines in FIGURES 9A and 9B.

Previous attempts at reproduction of sound simply through division of the audio frequency band into "lows" (actually including intermediate frequencies as interpreted in this disclosure) and "highs" (higher treble) resulted in "skating," i.e. voices and individual instruments first came from one speaker then the other depending strictly upon the frequencies being reproduced due to sharp crossover and because there has been no regard to a proper overlapping of frequencies over the proper frequency range. This "proper range" has heretofore consistently been deemed "low" rather than "intermediate." Further, apparently, no realistic analysis has previously been made as the frequency ranges covered by human voices or individual instruments.

The surprisingly similar effects obtained by stereotonal reproduction as directly compared to reproduction of the same recording on a standard high quality stereo system, can readily be explained by consideration of the standard, typical physical arrangement of an orchestra, such as depicted in FIG. 3, particularly a symphony orchestra or a philharmonic orchestra of the type which is used for recording the most-listened-to classical music.

Starting with the physical arrangement of such an orchestra, which is considered as standardized procedure, next consider the basic audio frequency ranges of the musical instruments comprising the orchestra in relation to their physical positions in that orchestra: Bass instruments are predominately positioned on the left; string and high frequency instruments are placed on the right; generally medium frequency instruments are in the center.

Therefore, most often and disregarding "novelty" recordings, it will be readily apparent that a "two-microphone" stereophonic recording does this: the "left" microphone of the stereophonic recording system picks up the sounds of the (nearest) bass instruments most predominantly—the middle or center medium-frequency instruments less prominently, because they are further from the microphone; and the string and high-frequency instruments only faintly because of their great distance from the left microphone.

On the other hand, the "right" microphone of this same stereophonic recording system picks up the nearby high frequency musical instruments most strongly; the center medium-frequency instruments less strongly (generally or averaging about the same strength as these center medium-frequency instruments are picked up by the "left" microphone since they are on an average, equidistant from both "right" and "left" microphones); the far-left or bass instruments are picked up only faintly because again of their relatively great distance from the "right" microphone.

When such stereophonic recording is reproduced through a standardized dual-amplifier, dual-speaker system the results will be obvious and the reproduction will have a realistic quality.

The left speaker reproduces the left positioned bass instruments most loudly; the "right speaker" reproduces the high-frequency and string instruments most loudly. As a result we hear "left" and "right" positioned instruments predominantly from the "left" and "right" speakers. Since the "center," medium-frequency musical instruments are picked up and reproduced at substantially the same volume levels by both "left" and "right" microphones and speakers, these frequencies (and instruments) appear to be in the center because we are hearing them equally through both ears. Thus we have stereophonic reproduction.

In comparision to this consider now the sound reproduction system of the present invention. From any monophonic recording, present-day high quality hi-fi or even—surprisingly—from old records, even 78 r.p.m. records, through frequency or tonal discrimination (which includes substantial coincidence of the medium frequencies, as seen by the parts between dotted lines in FIGURES 9A and 9B) the left speaker reproduces low frequencies most loudly; medium frequencies with less volume; and high frequencies almost not at all. The "right" speaker is loudest at high frequencies; reproduces medium frequencies at lower volume; and almost completely cuts out the low frequencies.

As will be apparent, the resulting sound reproduction is very nearly identical to that of true stereo when the proper medium-frequency overlap is obtained by proper choice of circuit components. In many cases, as previously mentioned, it is almost impossible if a stereophonic recording is being reproduced for the human ear to tell the difference when the system is switched from true-stereo reproduction to "stereotone."

As with stereo, and with standardized orchestra positioning of the various musical instruments, bass comes from the left, high frequencies from the right, and medium frequencies from the center because these medium frequencies are being reproduced substantially equal in strength by both left and right speakers.

As a modification, FIG. 6 shows in block diagram form an arrangement made in accordance with the teachings of the present invention, where it will be noted that there are two sound sources 1(*a*) and 1(*b*), denoting dual-channel stereo input. Also there are two identical tonal amplifiers, 2(*a*); two identical amplifiers, 2(*b*); and additionally two identical amplifiers, 2(*c*).

The voltage-power amplifiers 3 and sound reproducers or loud speakers 4 can be identical to those of FIG. 5.

Switches 5 and 6 are also added in the arrangement of FIG. 6.

In effect the arrangement shown in FIG. 6 performs identically with the arrangement shown in FIG. 5 when used for stereotonal sound reproduction, except that the tonal-amplifiers 2(*c*) are added to boost very-high frequency response (primarily about 5000 cycles).

For stereotonal reproduction the single-pole single-throw switch 5 is closed; thus effectively combining the dual stereo inputs 1(*a*) and 1(*b*) into a common monaural source. This proves particularly useful when a stereo-phono pick-up is being used to pick up sound from a monaural recording.

Otherwise a single monaural source can be used through either 1(*a*) or 1(*b*) and switch 5 then acts to connect it to the inputs of both stereotone channels.

Obviously further switching of the inputs can be done, as from phono to radio, etc., as is common practice.

For stereotonal reproduction switch 6, a double-pole single-throw switch, must be in the open or off position. Thus the upper tonal-amplifier 2(*a*) alone is connected to the upper or left channel amplifier 3. Amplifier 2(*a*) amplifies only low plus intermediate (overlapping) frequencies, and only these frequencies are reproduced through the left loud speaker 4.

In like manner, with switch 6 open, only lower amplifiers 2(*b*) and 2(*c*) are connected to the lower or right channel amplifier 3 and right speaker 4. Since tonal-amplifier 2(*b*) passes only the high and intermediate (overlapping) frequencies while amplifier 2(*c*) acts only to boost the extra-high audio frequencies, only such frequencies are reproduced by the right loud speaker 4.

Thus stereotonal reproduction is accomplished.

In addition, by the simple expedient of opening switch 5 (thereby using dual-stereo inputs) and closing switch 6, true stereophonic reproduction can also be accomplished. Through use of tonal-amplifiers, rather than the more commonly used tone-(attenuation)-controls, stereophonic reproduction, too, is greatly enhanced.

Obviously so-called hi-fi (monaural) reproduction, either through one or both speakers can also be obtained by simply closing both switches 5 and 6.

Thus, FIG. 6 shows the versatility of this system of sound reproduction.

Also, obviously—although not shown in the block diagrams—a master single or dual volume control (attenuator), and dual individual controls acting as tone controls can be used to regulate the strength and, therefore, the output of the tonal-amplifiers providing input signal strength to the voltage-power amplifiers, and separate "balance" controls in each voltage-power amplifier can be employed in both arrangements as shown in FIGS. 5 and 6.

FIGS. 7 and 8 are reproduced from the Philco Electronic Supervisor, January 1959, and show a response curve of human audibility and sound intensity requirements, respectively.

FIGS. 9(A) and (B) show typical frequency response curves required for best stereotonal reproduction. These curves cover the same frequency range from near zero beyond 10,000 cycles and are drawn to the same logarithmic scale as the charts of FIGURES 7 and 8 and represent the preferred response from the left sound channel (A) and the right sound channel (B) of the present invention. The dotted lines define the frequency range (shown from approximately 100 cycles to approximately 2,000 cycles) in which the sound outputs from the two channels overlap and substantially coincide with substantially equal or similar response and amplitude characteristics throughout. Obviously these response curves can be modified or changed within limits with little noticeable effect to the human ear. Also, various and well known means can be used to obtain such frequency response from the stereotone amplifiers. Therefore, this invention is not to be limited in any way by reason of the typical-response curves shown or any real or assumed frequency limits derived therefrom.

This system of sound reproduction is not simply a separation of sound frequencies—high frequencies from one speaker and low frequencies from a second, physically spaced speaker.

Such a simple division of high and low sound frequencies is not new and does not at all result in the pleasing steretonal effects of the presently described invention.

The very desirable and highly pleasing "stereo" effects obtained in the sound system disclosed in this patent application result from a proper and carefuly balanced over-lapping of medium sound frequencies, as reproduced by the two physically or spacially separated speakers employed.

This proper overlap of medium frequency response of the two separated speakers, one speaker covering the range from lowest reproducible frequencies up to the order of 1000 to 2000 cycles before attenuation, and the second covering the range from highest audible, and reproducible, frequencies down to the order of 100 cycles before attenuation, produces such unbelievable stereo reproduction effects that even a stereo recording, picked up as would be a monophonic recording, or even by a monophonic phono pickup rather than a stereophonic pickup, is so reproduced as to be audibly almost indistinguishably different from this same stereophonic recording as reproduced on a strictly stereophonic system.

Certain aspects of the present invention are applicable to recording, broadcasting and sound movies. Therefore, the scope of this invention includes such variations and is not to be limited to the terms of this disclosure.

Having thus described my invention, what I claim as novel and desire to secure by Letters Patent of the United States is:

1. A sound reproducing system comprising in combination, a single source of electric waves of audio frequencies, two spacially separated speakers, a separate amplifier channel for each speaker and energized in parallel from said source, each of said channels being constructed to transfer only a sub-band or portion of the entire audio band, said portions transferred by said channels being at opposite frequency extremes of the audio band but each extending into partial overlapping relation to the other, said overlapping portions extending throughout a range from the order of five hundred to the order of one thousand cycles and throughout this range substantially coinciding in response characteristics and amplitude whereby both speakers deliver similar responses for the overlapped range.

2. The sound reproducing system of claim 1 in which said amplifying channels are so constructed that the overlapping frequency portions are in the range included between the limits of the order of two hundred and fifteen hundred cycles per second, and have substantially similar response and amplitude characteristics in the selected portion thereof.

3. The sound reproducing system of claim 1 in which one said original amplifier channel is augmented by at least one subchannel complementing and augmenting the original channel in response characteristics at and beyond the range of its original channel.

4. The sound reproducing system of claim 3 in which each of said original amplifier channels only is directly connected to its channel speaker, and sub-channels and switch means are arranged to connect the sub-channels to the speakers allotted to their main channels whereby a monaural, dual range, dual-speaker system may be achieved.

5. The system of claim 4 in which each main channel with its sub-channel is provided with a separate input souce and switch means is provided to connect said inputs together whereby a monaural source may energize both channels for multi-speaker operation each at full frequency range, or with the switch of claim 4 open to achieve a stereophonic effect by energizing through two speakers in different frequency ranges generally in accord with the spacial disposition of the source frequencies.

6. The system of claim 1 in which each amplifier channel includes means to amplify at different selected rates the various frequencies within its range capabilities.

7. The system outlined in claim 1 in which the subbands are each amplified less in the overlapping areas than in their principal independent areas of amplification.

References Cited in the file of this patent

UNITED STATES PATENTS

| | | |
|---|---|---|
| 2,616,970 | Broos | Nov. 4, 1952 |
| 2,777,901 | Dostert | Jan. 14, 1957 |
| 2,852,604 | MacCutcheon | Sept. 16, 1958 |
| 2,864,897 | Kaar | Dec. 16, 1958 |